US011620123B1

(12) United States Patent
Sharma et al.

(10) Patent No.: US 11,620,123 B1
(45) Date of Patent: Apr. 4, 2023

(54) SWIMLANE-BASED CLOUD SOFTWARE RELEASES

(71) Applicant: MORGAN STANLEY SERVICES GROUP INC., New York, NY (US)

(72) Inventors: Girish Sharma, Pennington, NJ (US); Robert Sherman, Brooklyn, NY (US); Sunil Kalkunte, Morristown, NJ (US); Swaminathan Annadurai, Alpharetta, GA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 17/963,429

(22) Filed: Oct. 11, 2022

(51) Int. Cl.
G06F 9/445 (2018.01)
G06F 8/65 (2018.01)

(52) U.S. Cl.
CPC ...................................... *G06F 8/65* (2013.01)

(58) Field of Classification Search
CPC .......................................................... G06F 8/65
USPC .......................................................... 717/168
See application file for complete search history.

(56) References Cited

U.S. PATENT DOCUMENTS

| 2004/0049509 A1 | 3/2004 | Keller et al. |
| 2006/0230314 A1 | 10/2006 | Sanjar et al. |
| 2012/0117531 A1 | 5/2012 | Rosenbaum et al. |
| 2013/0325789 A1 | 12/2013 | Krishnan et al. |
| 2016/0077809 A1 | 3/2016 | Heyhoe et al. |
| 2016/0139916 A1 | 5/2016 | Pilay et al. |
| 2016/0239280 A1 | 8/2016 | Scheiner et al. |
| 2016/0378449 A1 | 12/2016 | Khazanchi et al. |
| 2017/0372247 A1 | 12/2017 | Tauber et al. |
| 2019/0129712 A1 | 5/2019 | Hawrylo et al. |
| 2019/0317757 A1 | 10/2019 | Jodoin et al. |
| 2020/0081872 A1 | 3/2020 | Sharma et al. |
| 2021/0042103 A1 | 2/2021 | Kibel et al. |
| 2021/0176210 A1* | 6/2021 | Chan ....................... H04L 67/10 |
| 2021/0240818 A1 | 8/2021 | Seksenov et al. |
| 2021/0405985 A1 | 12/2021 | Shteyman et al. |
| 2022/0215010 A1* | 7/2022 | Dash .................... G06K 9/6251 |
| 2022/0329585 A1* | 10/2022 | Chhabra ................. H04L 63/00 |

* cited by examiner

*Primary Examiner* — Chuck O Kendall

(74) *Attorney, Agent, or Firm* — Weitzman Law Offices, LLC

(57) ABSTRACT

A system is disclosed for coordinating multiple software component deployments, upgrades, or migrations simultaneously or individually across a multiple-location/cloud platform. The system includes an application gateway router that routes incoming API requests based on an identifier in headers of the request that is associated with a swimlane construct, the swimlane containing multiple software components. By associating a swimlane's possible destinations with a timestamp or time range indicating when they are in effect, all of the components in the swimlane can be simultaneously upgraded or migrated by changing the API endpoint to which requests will be forwarded, with zero downtime. This solution is technology-, platform-, and cloud-agnostic and can be extended and applied to any organization using software. Application owners are empowered to run their application in any combination of cloud-provider, region, environment, business channel, and app, with possible sandbox instances in any lower environment for any combination.

13 Claims, 5 Drawing Sheets

SWIMLANE-BASED CLOUD SOFTWARE RELEASES

FIELD OF INVENTION

This disclosure relates to systems and methods for managing versioned software releases into a production, non-production, or sandbox environment, and more specifically, to systems and methods that establish logical frameworks to organize software components and permit simultaneous migration of multiple software components in multiple environments and multiple platforms, including cloud hosting.

BACKGROUND

When a server or other computer system is providing a software service that is intended to be available with 100% uptime, providing updates to software components that make up the service presents a significant challenge. Changing software versions typically requires at least a moment in time during which older software processes are closed and the new software is loaded into memory for execution. Further complications may occur if downstream components may be in the process of communicating with the updated components at the time of the update.

This downtime can be mitigated or avoided by the use of a "blue-green" system architecture, wherein a "blue" server provides software services in production, while a "green" server is used for developing and testing an updated software version. When the updated version is ready for production, a router that has been forwarding requests exclusively to the blue server instead begins forwarding the requests to the green server. As a result, there is no moment of time when the service is not available, because the software was already running before the router configuration change.

Existing "blue-green" architectures have been used for transitioning completely between one full server and another server (when the router forwards all traffic to one server and blocks all traffic from the other), or for transitioning use of a single component (when the router identifies the purpose of the request and forwards to one server or the other based on which is the blue server and which is the green server for that component).

However, some use cases require greater flexibility. One such case is when it is desired to transfer the destination associated with some particular stacks or sets of interdependent components that form a particular application or process, without necessarily transferring all traffic to or from a server. Another case is when multiple version changes are desired across environments simultaneously, such as upgrading a production server from "Version 1.0" to "Version 2.0" at the same time that the testing environment is upgraded from "Version 2.0" to "Version 3.0." Multiple versions of a single component may need to coexist with their relative dependencies in a production environment for staging, production issue simulations or tests, and for testing newer versions in isolation. Further, some use cases require a finer level of control than merely "blue" and "green" where a given process instance can participate in a logical environment, in order to reproduce an as-is instance of a production environment or leverage test data from different environments, etc. Thus, there are advantages to systems that allow for finer control over updates to a variety of software components operating on various servers and with various interdependencies between them across platform and cloud instances.

SUMMARY OF THE INVENTION

The present disclosure creates a conceptual set of "swimlane" constructs and smart pipelines to help manage software releases, especially migration of software components piecemeal into a cloud-based infrastructure without negatively affecting the on-premises systems those components are currently in communication with. This enables multiple versions of software and their associated dependencies to coexist in a same environment and to be released or updated at any time at a cloud or local destination.

By sharing the swimlane identifier between components in communication with each other and making routing decisions conditional on the swimlane identifier, each component can be fully agnostic as to whether it is executing in a cloud-based environment or a local, on-premises environment. This scheme helps to support zero-downtime deployments and upgrades, and even simultaneous releases and upgrades across multiple environments, so that each environment in a spectrum of environments from development to production can be upgraded to use the software in the environment one level lower.

The use of these swimlane identifiers can also serve to isolate software for testing purposes. A sandbox can be established that simultaneously incorporates components from two or more different environments, but prevents software inside the sandbox from communicating with other software on either of the environments. Such a sandbox allows additional time to test software, and even to check the interoperability of software in a testing environment with software in a production environment, without actually deploying the software to the production environment.

A system for managing deployment of versions of software components is disclosed. The system includes an application gateway router; two or more servers providing software services; and non-transitory memory comprising instructions. When the instructions are executed by one or more processors the one or more processors associate at least two software components operating on the two or more servers with a swimlane identifier; and associate a cutover time with a swimlane, such that before the cutover time, every request associated with the at least two software components will be forwarded by the application gateway router to a first application programming interface (API) endpoint, and after the cutover time, every request associated with the at least two software components will be forwarded by the application gateway router to a second API endpoint different from the first API endpoint.

In another variant, the deployment of applications involves deploying the at least two software components to the two or more servers, such that smart pipelines are used to deploy the two or more software components to the two or more server instances or web ports on a same server such that they identify availability of the server instances or web ports on same server in a round robin allocation, avoiding deployment to a live swimlane while automatically updating friendly service names for deployed versions of the at least two software components, such that a newer version of an application associated with the at least two software components can be enabled to go live using the swimlane based on an updated cutover timestamp for the newer version.

A system for creating a cross-environment software testing sandbox is also disclosed. The system includes an application gateway router; two or more servers providing software services in multiple environments, including at least one production environment and at least one development or testing environment; and non-transitory memory comprising instructions. When executed by one or more processors, the instructions cause the one or more processors to receive a request to create a virtual sandbox environment; associate at least one software component in the at least one production environment with the virtual sandbox environment; and associate at least one software component in the at least one development or testing environment with the virtual sandbox environment. The system prevents communication between all software components associated with the virtual sandbox environment and all software components not associated with the virtual sandbox environment, based on a difference between a swimlane identifier shared by all software components associated with the virtual sandbox environment and lacked by all software components not associated with the virtual sandbox environment. The system forwards requests to an API served by the virtual sandbox environment to one of the software components associated with the virtual sandbox environment, based on presence of the swimlane identifier in a header of the requests.

The sandbox functionality permits testing of software components to ensure that a component in a testing environment is able to interact successfully with components already in the production environment, or that a component that has traditionally interacted only with on-premises dependencies will still function if its dependencies have moved to the cloud.

By using this technology, app owners are now empowered to run their application in any permutation and combination of cloud provider, region, environment, business channel and app, with an option to have a flavor of sandbox instance in any lower environment for any such permutation or combination. All these permutations can enable many options to extend to n number of swim-lane where each swim-lane represents:

Region: Central, Eastern, etc.
Environment: Mainly four environments—Dev, QA, PE and Prod
Sub-Environment: Two sub-environments but can be expanded as needed
Zone: Intranet or Internet
Channel: Client, FA, Mobile, etc.
Target: Sandbox, or Prod-Stage
Cloud Identifier: Azure, On-premises, AWS, etc.

The present approach simplifies creating such swim-lanes on demand using Infrastructure as Code for any given platform and repurposing or eliminating them as needed. This makes the future of application cloud hosting and management much simpler, standard, and cost effective.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

Figure 1:
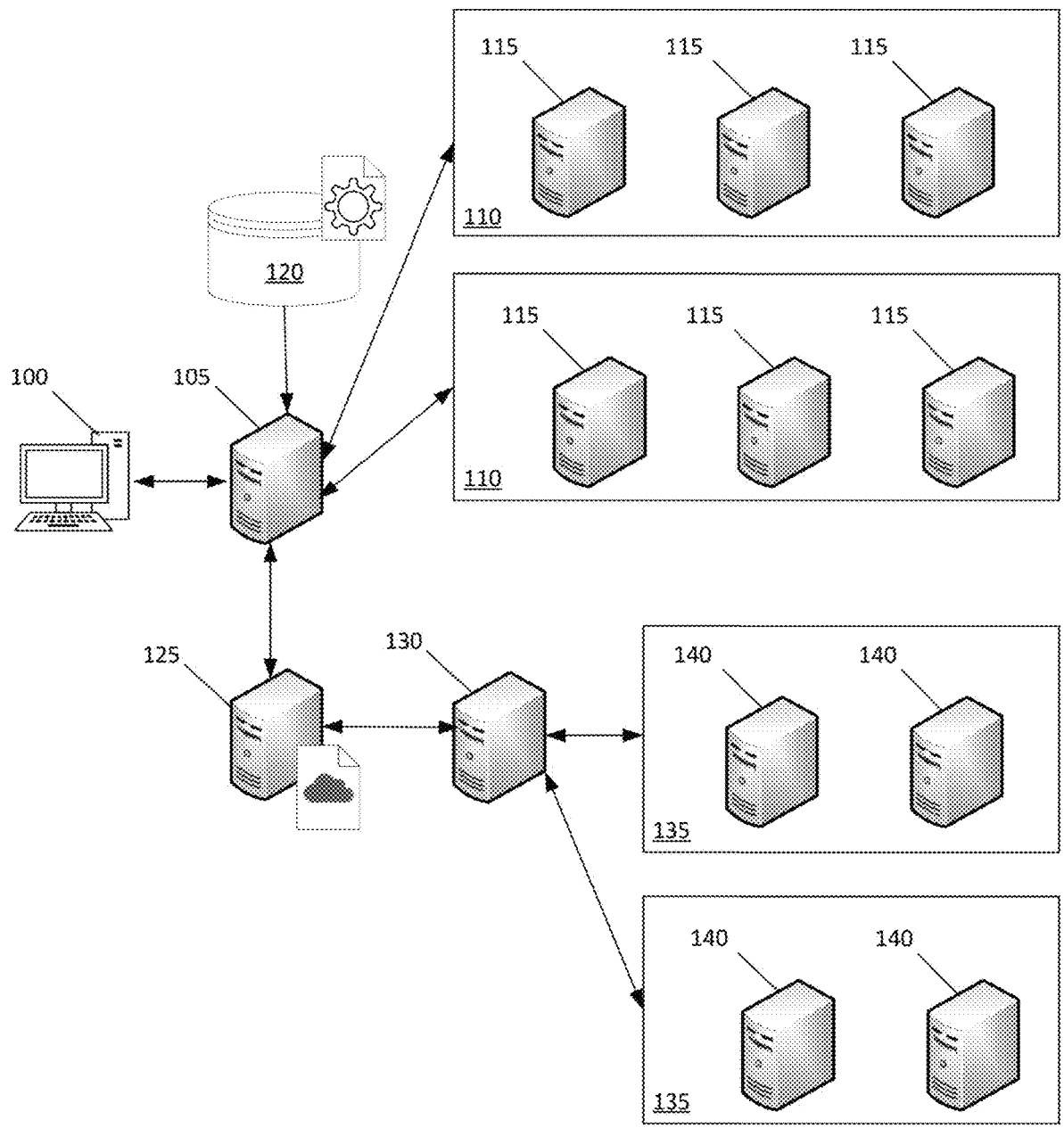
FIG. 1 illustrates, in simplified form, a system of computing devices used in providing an application with both local and cloud-based components.

As briefly discussed above, in order to address existing limitations in routing of API requests to blue-green or other server topologies, a "swimlane" based solution is used to group sets of software components together for interaction, deployment, upgrading, or migration. All API requests are associated with a swimlane identifier in headers of requests, and an API management system having a gateway router will forward a request to a particular API endpoint based on the swimlane identifier. By changing the configuration information associated with each swimlane, the version(s) of software components in the swimlane may be instantly upgraded, rolled back, or otherwise changed by changing the endpoint to which the request will be forwarded.

For example, the configuration information could store the following information regarding eight swimlanes that had been established on three environments (production, development, and testing/quality assurance):

| App Environment | Swimlane | App and version example |
|---|---|---|
| Sandbox | qa-1-ext-mso-CICD1 | ProfileSal v3.1 and other qa-1 dependencies |
|  | dev-1-ext-mso-CICD1 | ProfileSal v3.2 and other dev dependencies |
| Development | dev-1-ext-mso | ProfileSal v2.0 and other dev-1 app dependencies |
|  | dev-ext-mso | ProfileSal v2.1 and other dev app dependencies |
| QA | qa-1-ext-mso | ProfileSal v2.0 and other qa-1 app dependencies |
|  | qa-ext-mso | ProfileSal v2.1 and other qa app dependencies |
| Production | prod-ext-mso-stage | ProfileSal v1.1, v0.9 and other prod-stage app dependencies |
|  | prod-ext-mso | ProfileSal v1.0 and other prod app dependencies |

In a preferred embodiment, for every environment, every application will have two distinct versions, each associated with its own swimlane, and possibly more than two versions. Every application is also preferably associated with one or more sandboxes that are capable of including components from multiple environments. The model disclosed here allows hosting of any arbitrary number of concurrent versions, if needed, in an environment or in logical sub environments.

As can be seen from the version numbers in the table above, even within a particular environment, multiple versions of software may be running simultaneously: 1.0 and 1.1 in production, 2.0 and 2.1 in the exclusively development and QA environments, and 3.1 and 3.2 in the sandbox environments. When sufficient stability and functionality are established for a higher version number, routing configuration information can be updated to cause a redirection of routing requests from one to the other, starting at a predefined moment in time. For example, all requests to the production environment may be forwarded to the v.1.0 software component until midnight on a particular day, at which point they will all switch over to being forwarded to the v.1.1 software component with no interruption in service. When it is time for a major upgrade, the routing table can indicate that after the predetermined moment, the URL of one of the 2.0 or 3.0 software components will be the routing endpoint instead.

By relying on these cutover times to actually allow access to the software components, the deployment of a component can be fully decoupled from the release of a component. Rigorous testing can occur while a component is already in place at its intended destination, without fear that users or other components will interact with it prematurely, before the cutover time.

In a preferred embodiment, each swimlane encodes a named context in which apps reach their dependencies. The context can encode such information as the environment (production, stage, QA, development), a sub-environment (such as a 1, 2, 3; a, b, c; or other series of symbols if needed for disambiguation), whether the context is internet facing or intranet facing, an application name, an application version, or a data channel used to access the application (such as a mobile device, or a web site or other internet-based connection).

Although each swimlane will only have one version of each software component present in that swimlane, it is possible for a single version of a software component to be incorporated into multiple swimlanes at the same time.

Deployment of software within these swimlanes is accomplished via the use of smart pipelines. In a preferred embodiment, Microsoft Azure Pipelines are used to facilitate some of this functionality, while in other embodiments, different software might be used. The smart pipelines continually update the configurations of infrastructure components to automatically create the configuration file that will be used to route requests and to change over to a new software version at a predetermined time. As part of this configuration file creation process, the smart pipeline will generate the swimlane name to act as a unique alias to be associated with a particular API endpoint. The configuration will also ensure that software components do not interact with other components outside of their swimlane or outside of a sandbox to which they have been confined for testing.

The smart pipelines may contain a number of other features, such as performing post-deployment testing of components (and queueing up a cutover time to release the component only if the testing is successful) as well as generally managing the number of swimlane deployment slots, creating a new swimlane whenever necessary and destroying the oldest swimlane present if there are no deployment slots available.

When it comes time to migrate, upgrade, or roll back, as described further below in relation to FIGS. 3 and 4, smart releases with zero downtime are accomplished by associating each swimlane with multiple endpoint URIs, with a particular start timestamp for each, and an implicit end timestamp for each except the last. At any time between the start timestamp and the next start timestamp (if any), all API requests to components in the given swimlane will be routed to the given URI. Because this change in routing destination is completely automatic and affects the entire swimlane simultaneously, any number of software components may be upgraded or rolled back at the same time or individually, with zero downtime or possible errors introduced by imperfect coordination between independent updating processes. For example, if there were a loop that acted on each component in turn and updated it, it would be possible that a request arrived while some components were already upgraded and others were not, leading to possible error or incompatibility.

API requests are routed to a destination based on HTTP headers associated with the request and on the stored swimlane configuration, as described further below in relation to FIG. 2.

By default, a rollback will occur in cases of emergency only. The intent of the progressive, cascade-style of version updates is that each version has been thoroughly tested on a given environment before being promoted to the next environment. When a rollback is needed, a method of rolling back to a prior version is described below in relation to FIG. 4. In other cases, it may be preferred to simply not promote that software during the next iteration of upgrades, and overwrite the software with a new version from a lower environment that may have fixed the issue.

FIG. 1 illustrates, in simplified form, a system of computing devices used to provide an application that is made up of both local, on-premises components and cloud-based components.

Whenever a client 100—which may be a particular computing device, a software module running on a device, an edge device that is forwarding requests from an unknown system type behind the edge device, or any other device that generates or forwards a request—contacts an application gateway router 105, that router must determine which of several possible server clusters 110 to send the request to, as well as possibly also deciding which server 115 on that cluster should act on the request. In a preferred embodiment, this decision is made by a Microsoft Azure Config Service (ACS) or other configuration module 120 storing information that is described more fully in relation to FIG. 2 and discussed below.

Because one or more software components may be cloud-based solutions instead of locally operated, a request may be forwarded to a cloud gateway 125, such as a Spring Cloud Gateway that will pass the request on to another gateway 130 at an unknown location. That second gateway 130 might be, for example, an Apigee gateway. The gateway 130 then needs to forward the request to a server cluster 135 and optionally a particular server 140 in that cluster.

Although a particular division of functions between devices is described with relation to the systems depicted in FIG. 1 other configurations are possible in which functions are divided among devices differently. For example, all of the functions of some or all of the client 100, router 105, or configuration module 120 might be performed by a single device with multiple threads executing different software modules simultaneously.

Alternatively, each router or other computing device may instead be a cluster of computing devices sharing functionality for concurrent processing. The specific number of computing devices and whether communication between them is network transmission between separate computing devices or accessing a local memory of a single computing device is not so important as the functionality that each part has in the overall scheme. What does remain of importance is that there are multiple server endpoints capable of providing services based on software components deployed there, and that a routing system must decide which server will serve as the endpoint for a given request.

Figure 2:
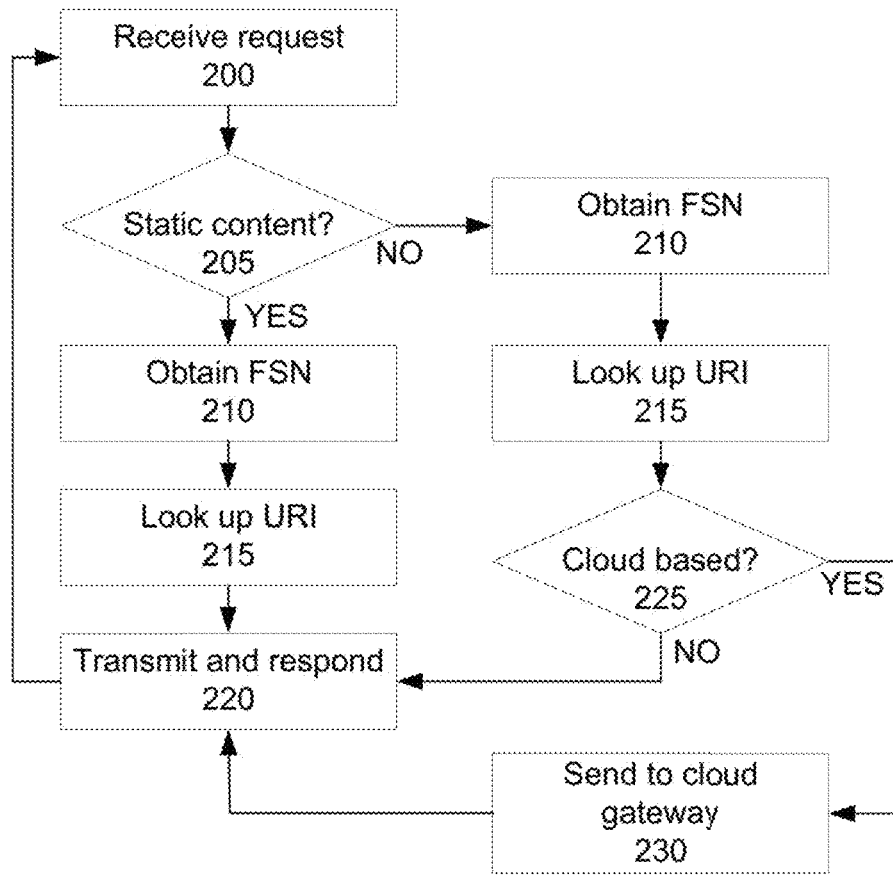
FIG. 2 illustrates, in simplified form, a method of routing requests received at the API gateway.

FIG. 2 illustrates, in simplified form, a method of routing requests received at the API gateway.

After receiving a request (Step 200), the gateway determines whether a request is a static content request or an application service request (Step 205).

Next, in either case, the header of the request is parsed to obtain the Friendly Service Name (FSN) and swimlane associated with the request (Step 210). The configuration file is consulted to determine the URI associated with that swimlane and FSN at the present moment in time (Step 215), by consulting a table similar to the following:

| Label | Key | Value | |
|---|---|---|---|
| Revision | FSN | Environment | URI |
| 2022-0628T20:00:01+00:00 | ProfileSalSelfService | qa-1-ext-mso-azure | cc-use2-qa1-ext-mso-prst-api-app/qa1-beta |
| 2022-0628T21:00:01+00:00 | ProfileSalSelfService | qa-ext-mso-azure | cc-use2-qa1-ext-mso-prst-api-app |
| 2022-0629T20:00:01+00:00 | ExtraSalService | qa-1-ext-mso-azure | cc-use2-qa1-ext-msm-extr-api-app/qa1-beta |
| 2022-0629T21:00:01+00:00 | ExtraSalService | qa-ext-mso-azure | cc-use2-qa1-ext-msm-extr-api-app |
| 2022-0629T20:00:01+00:00 | OlderSalService | qa-1-ext-mso-azure | cc-use2-qa1-ext-msm-oltr-api-app/qa1-beta |
| 2022-0629T21:00:01+00:00 | OlderSalService | qa-ext-mso-azure | cc-use2-qa1-ext-msm-oltr-api-app |

FSNs are preferably stored in memory with these additional attributes/details:
{
"key": "FSN_name | Swimlane_name",
"label": "CurrentTimestamp | Hash of FSN value | EonId",
"value": "[{fsn:"fsnName", environment:"Fsn stage environment with zone", uri: <app uri >, traits: " "}]"
}
Or, for example, with this array for an application in two environments:
{
"key": "profileSalSelfService|<swimlane>",
"label": "2022-0617T20:00:01+00:00|2aWkdy8uCKRiyyqMT9vY4Or7KWi|10180",
"value": "[{fsn:"profileSalSelfService", environment: "prod-ext-mso-stage-azure", uri:"cc-use2-prod1-ext-mso-prst-api-app",traits:"auth=azure-ad"}]"
},
{
"key": "profileSalSelfService|<swimlane>",
"label": "2022-0617T20:00:01+00:00|3h5kdy8uCKRiyyqMT9vY4jy956i|10180",
"value": "[{fsn:"profileSalSelfService", environment: "prod-ext-mso-azure", uri:"cc-use2-prod1-ext-mso-prst-api-app", traits:"auth=azure-ad"}]"
"lastModified": "2022-06-17T20:00:00+00:00"
}

If the request is a static content request, the gateway router then simply routes the request to the proper local address and permits the server there to send its response to the client (Step 220). If the request is an application service request, the router will need to determine, based on the URI, whether the endpoint is local and on-premises, or has been migrated to the cloud (Step 225). If local, the ordinary routing and response is performed (Step 220). If the destination is cloud-based, the request will be forwarded to a cloud gateway (Step 230); in a preferred embodiment, this would be handled by the Spring Cloud Gateway system, though other software solutions could be equally compatible.

After the routing has been completed, the API gateway returns to waiting for the next request (back to Step 200).

Figure 3:
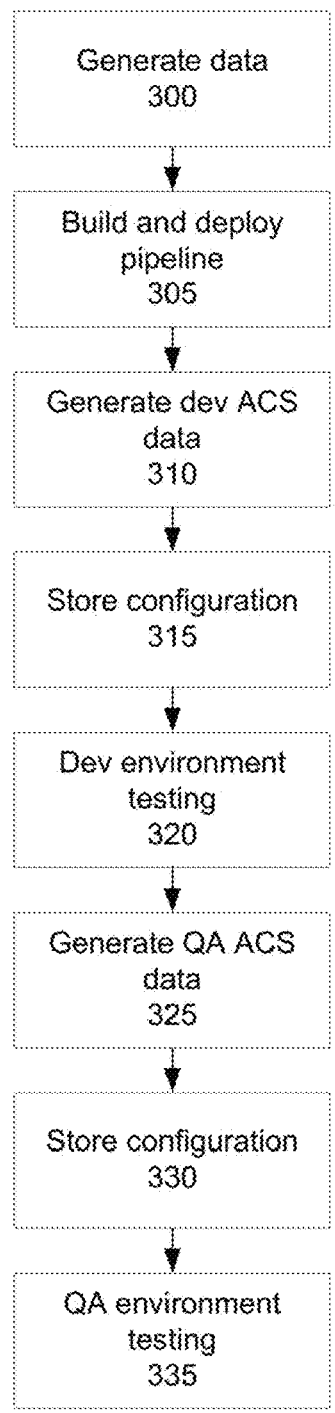
FIG. 3 illustrates, in simplified form, a flowchart of a swimlane deployment sequence.

FIG. 3 illustrates, in simplified form, a flowchart of a swimlane deployment sequence.

Initially, a template is identified and all variables for the template are filled in to generate Friendly Service Names and the cutover data to be entered into the configuration table (Step 300).

Next, a pipeline is built and deployed to the development environment (Step 305).

Data with the FSN and swimlane associated with the development environment are generated in a format expected by the Azure App Configuration service (ACS) (Step 310) and subsequently inserted into the configuration storage associated with the gateway router (Step 315)

At the same time, on the development environment, test scripts may be run to ensure that the deployment was a success (Step 320).

In response to a successful deployment test, data with the FSN and swimlane associated with the QA environment are generated in a format expected by the ACS (Step 325) and subsequently inserted into the configuration storage associated with the gateway router (Step 330)

Additional test scripts may be executed in the QA environment (Step 335). If successful, deployment to production may be approved by a human user or automatically triggered in response to other factors.

Figure 4:
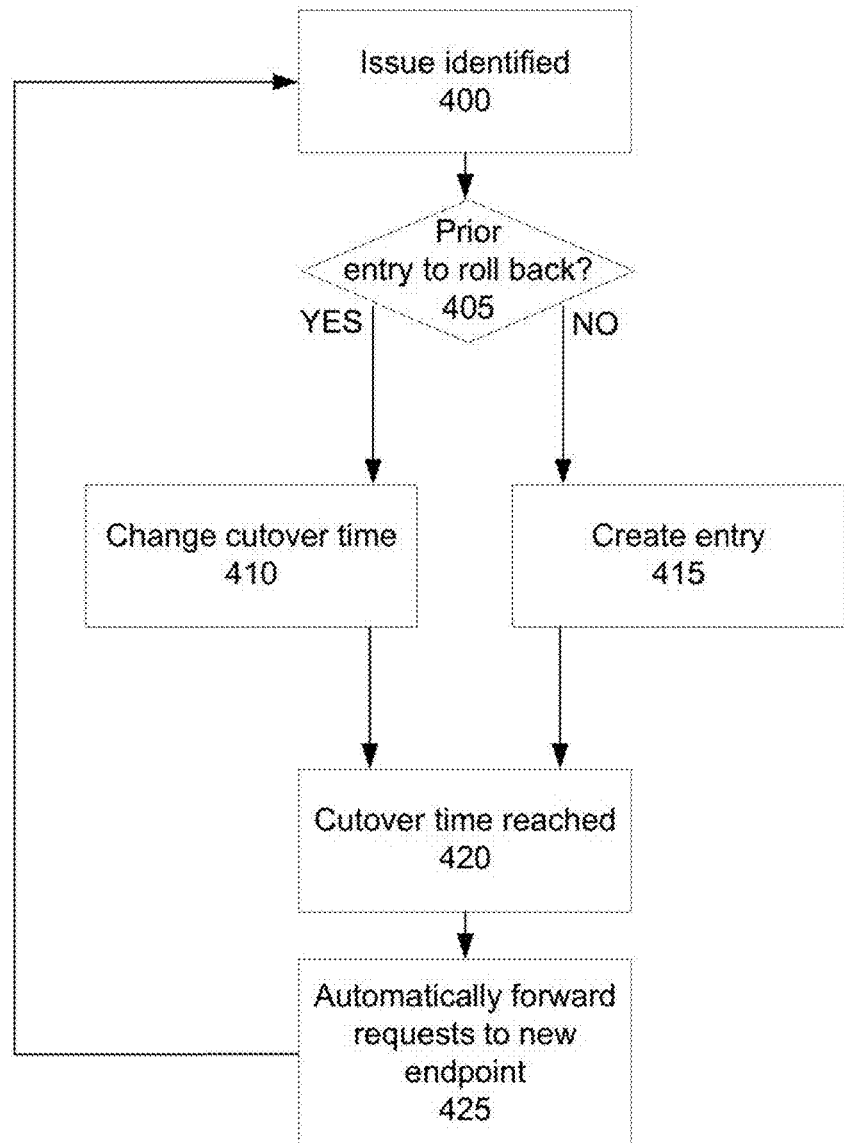
FIG. 4 illustrates, in simplified form, a method of rolling back a deployment within a swimlane.

FIG. 4 illustrates, in simplified form, a method of rolling back a deployment within a swimlane.

Whenever an issue is identified (Step 400), especially in a production environment, it may necessitate an emergency rollback to a more stable version of the affected software component. In a preferred embodiment, the table associating swimlanes with cutover times will still contain, if not the entire history of the swimlane containing the component, at least the most recent entry before the most recent cutover. If such an entry exists (Step 405), the entry's cutover time may be set to the current time (Step 410). Alternatively, a different time may be chosen, such as a time that is less likely to break functionality in ongoing software sessions that are not compatible with a prior software version.

If no such prior entry exists, an entry in the table may be created (Step 415), setting the swimlane's cutover time to the present or to an imminent time. The created entry would preferably be for the same swimlane and same set of components to all be used in their prior version, but in some instances, it might be preferable to use a sandbox swimlane instead that includes some components in a previous version in production and some with a more recent version in development or QA, since the identified software issue may not necessitate downgrading all of the software components simultaneously.

At the moment of the table change or shortly thereafter, the cutover time is reached (Step 420). As a consequence, the router automatically begins forwarding requests to a new URI endpoint with a prior, more stable version of the software (Step 425).

Same versions of software and/or the software's dependencies can be enabled very easily on different business channels, so that segregation of business activity can be maintained if any swim lane goes down for whatever reason.

The swimlane construct is also supported cross-region (i.e., in different geographical regions where an organization might operate) to provide a redundancy and to give an additional dimension to scale the software as needed.

General Computing Devices

FIG. 1 depicts a preferred configuration of computing devices and software modules to accomplish the software-implemented methods described above, and those methods do not inherently rely on the use of any particular specialized computing devices, as opposed to standard desktop computers and/or web servers. For the purpose of illustrating possible such computing devices, FIG. 5, below, describes various enabling devices and technologies related to the physical components and architectures described above.

Figure 5:
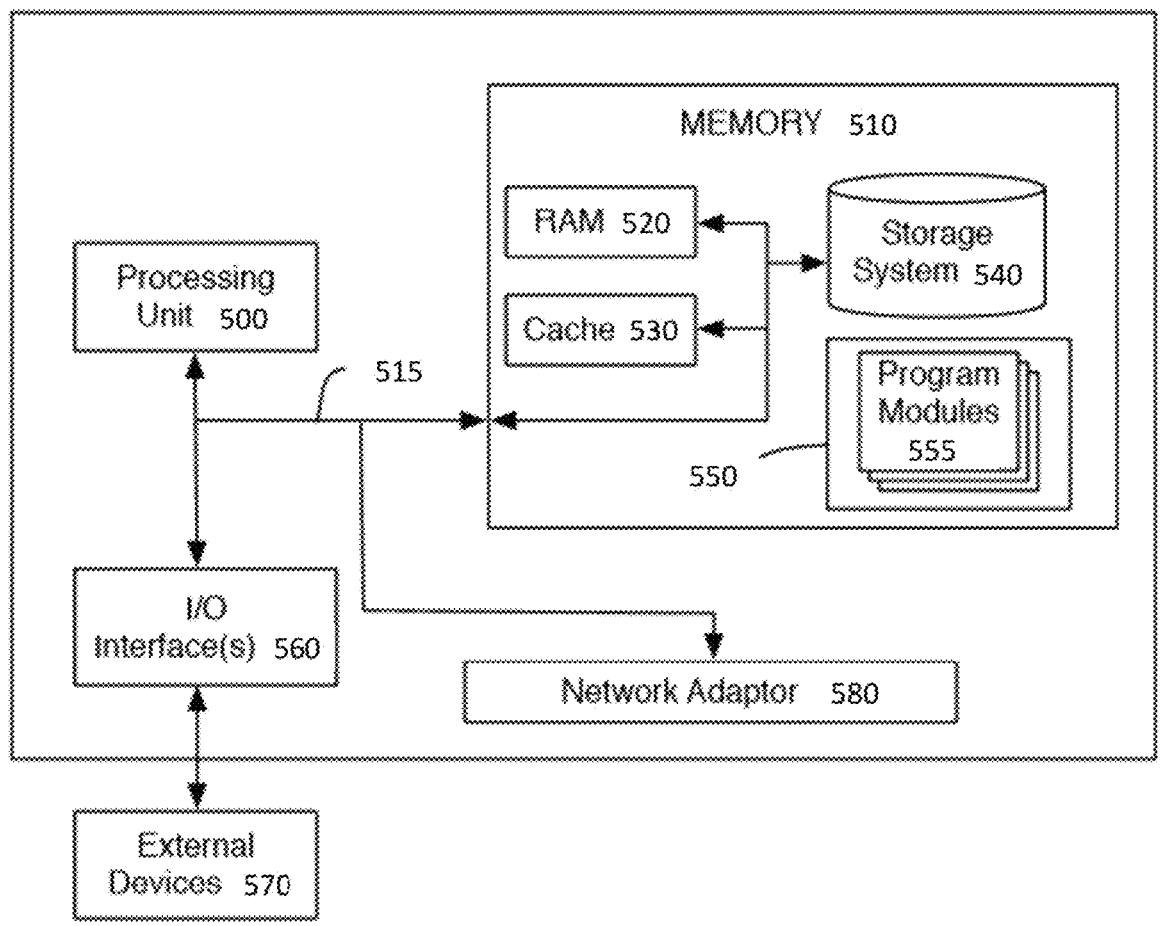
FIG. 5 is a high-level block diagram of a representative computing device that may be utilized to implement various features and processes described herein.

FIG. 5 is a high-level block diagram of a representative computing device that may be utilized to implement various features and processes described herein, for example, the functionality of the routers 105, 125, and 130, the servers 115 or 140, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 500, a system memory 510, and a bus 515 that couples various system components including memory 510 to processor 500.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 500 may execute computer programs stored in memory 510. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 500 may be used.

The computing device typically includes a variety of computer system readable media. Such media may be any available media that is accessible by the computing device, and it includes both volatile and non-volatile media, removable and non-removable media.

System memory 510 can include computer system readable media in the form of volatile memory, such as random access memory (RAM) 520 and/or cache memory 530. The computing device may further include other removable/non-removable, volatile/non-volatile computer system storage media. By way of example only, storage system 540 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 510 may include at least one program product having a set (e.g., at least one) of program modules that are configured to carry out the functions of embodiments described in this disclosure.

Program/utility 550, having a set (at least one) of program modules 555, may be stored in memory 510 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 570 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 560.

In addition, as described above, the computing device can communicate with one or more networks, such as a local area network (LAN), a general wide area network (WAN) and/or a public network (e.g., the Internet) via network adaptor 580. As depicted, network adaptor 580 communicates with other components of the computing device via bus 515. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for managing deployment of versions of software components, comprising:
    an application gateway router;
    two or more servers providing software services; and
    non-transitory memory comprising instructions that, when executed by one or more processors, cause the one or more processors to:
        associate at least two software components operating on the two or more servers across multiple data centers in both cloud and on-premises locations with a swimlane identifier;
        associate a cutover time with a swimlane, such that before the cutover time, every request associated with the at least two software components will be forwarded by the application gateway router to a first application programming interface (API) endpoint, and after the cutover time, every request associated with the at least two software components will be forwarded by the application gateway router to a second API endpoint different from the first API endpoint; and
        deploy the at least two software components to the two or more servers.

2. The system of claim 1, wherein a swimlane comprises one or more software components that are operated on-premises in a same local system with the application gateway router, and wherein the swimlane also comprises one or more software components that are cloud-based and external to the local system.

3. The system of claim 1, wherein at least two swimlanes have a same cutover time and the application gateway router begins forwarding requests to components of each swimlane to a new endpoint at the same cutover time.

4. The system of claim 3, wherein a first swimlane of the at least two swimlanes has a same endpoint of forwarded requests after the cutover time as a second swimlane of the at least two swimlanes had had before the cutover time.

5. The system of claim 1, wherein at least one software component is a member of at least two swimlanes.

6. The system of claim 1, wherein at least two swimlanes are maintained in each of at least two environments, including a production environment and a non-production environment.

7. The system of claim 1, wherein a smart pipeline sets a cutover time only if the two or more software components pass post-deployment testing.

8. A system for creating a cross-environment software testing sandbox, comprising:
   an application gateway router;
   two or more servers providing software services in at least two environments, including at least one development environment and at least one testing environment; and
   non-transitory memory comprising instructions that, when executed by one or more processors, cause the one or more processors to:
      receive a request to create a virtual sandbox environment;
      associate at least one software component in the at least one development environment with the virtual sandbox environment;
      associate at least one software component in the at least one testing environment with the virtual sandbox environment;
      prevent communication between all software components associated with the virtual sandbox environment and all software components not associated with the virtual sandbox environment, based on a difference between a swimlane identifier shared by all software components associated with the virtual sandbox environment and lacked by all software components not associated with the virtual sandbox environment; and
      cause the application gateway router to forward requests to an API served by the virtual sandbox environment to one of the software components associated with the virtual sandbox environment, based on presence of the swimlane identifier in a header of the requests.

9. The system of claim 8, wherein regression testing is performed to confirm that the at least one software component in the at least one development environment can interact with the at least one software component in the at least one testing environment, before allowing either software component to be promoted to a production environment.

10. The system of claim 8, wherein the two or more servers provide software services in at least one production environment, and wherein the virtual sandbox environment is associated with at least one software component in the at least one production environment.

11. The system of claim 8, wherein the at least one production environment is wholly or partially cloud-based, and wherein regression testing is performed to confirm that the at least one software component in the at least one development or testing environment can interact with the at least one software component in the at least one production environment, before allowing the at least one software component in the at least one development or testing environment to be migrated from an on-premises server to a cloud-based distribution.

12. The system of claim 8, wherein, if one of the software components associated with the virtual sandbox environment attempts to communicate with a software component not associated with the virtual sandbox environment, an alert is generated and displayed on a user interface to indicate that that software component has an unexpected external dependency.

13. A system for managing deployment of versions of software components, comprising:
   an application gateway router;
   two or more server instances or web ports on the same server, providing software services; and
   non-transitory memory comprising instructions that, when executed by one or more processors, cause the one or more processors to:
      associate at least two software components operating on the two or more servers across multiple data centers in both cloud and on-premises locations with a swimlane identifier;
      associate a cutover time with a swimlane, such that before the cutover time, every request associated with the at least two software components will be forwarded by the application gateway router to a first application programming interface (API) endpoint, and after the cutover time, every request associated with the at least two software components will be forwarded by the application gateway router to a second API endpoint different from the first API endpoint; and
      deploy the at least two software components to the two or more servers, wherein smart pipelines are used to deploy the two or more software components to the two or more server instances or web ports on the same server such that they identify availability of the server instances or web ports on same server in a round robin allocation, avoiding deployment to a live swimlane while automatically updating friendly service names for deployed versions of the at least two software components, such that a newer version of an application associated with the at least two software components can be enabled to go live using the swimlane based on an updated cutover timestamp for the newer version.

* * * * *